United States Patent [19]

Cadeddu

[11] 4,099,380
[45] Jul. 11, 1978

[54] MASTER-CYLINDER FOR HYDRAULIC BOOSTER

[75] Inventor: Leonardo Cadeddu, Crema, Italy

[73] Assignee: Benditalia S.p.A., Crema, Italy

[21] Appl. No.: 734,915

[22] Filed: Oct. 22, 1976

[30] Foreign Application Priority Data

Oct. 23, 1975 [IT] Italy .............................. 28610 A/75

[51] Int. Cl.² .......................... B60T 11/26; F15B 7/08
[52] U.S. Cl. ....................... 60/588; 60/589; 60/592
[58] Field of Search ................ 60/588, 589, 592, 562; 137/512.3, 512.4; 92/183

[56] References Cited

U.S. PATENT DOCUMENTS

| | | | |
|---|---|---|---|
| 2,254,937 | 9/1941 | Dick | 60/588 |
| 2,942,423 | 6/1960 | Brand | 60/589 |
| 3,141,303 | 7/1964 | Baldwin | 60/588 |
| 3,165,896 | 1/1965 | Baldwin | 60/562 |
| 3,300,973 | 1/1967 | Baldwin | 60/588 |
| 3,512,361 | 5/1970 | McCaffery | 60/568 |
| 3,800,541 | 4/1974 | Sindelar | 60/588 |

FOREIGN PATENT DOCUMENTS

| | | | |
|---|---|---|---|
| 317,092 | 4/1934 | Italy | 60/588 |
| 849,147 | 9/1960 | United Kingdom | 60/588 |
| 1,026,249 | 4/1966 | United Kingdom | 60/562 |

*Primary Examiner*—Martin P. Schwadron
*Assistant Examiner*—Abraham Hershkovitz
*Attorney, Agent, or Firm*—Leo H. McCormick, Jr.; Ken C. Decker

[57] ABSTRACT

The hydraulic master-cylinder of the invention is of the kind having a valve ring made of elastomeric material mounted on the head of a piston adjacent to the pressure chamber. The master-cylinder further includes a safety valve in the pressure chamber. The safety valve is guided on the piston head and is adapted to sealingly cooperate with both one face of the valve ring and a shoulder provided on the piston head. The safety valve is biased toward the valve ring by a spring abutting on a stop fixed relative to the piston.

8 Claims, 4 Drawing Figures

MASTER-CYLINDER FOR HYDRAULIC BOOSTER

BACKGROUND OF THE INVENTION

The invention relates to hydraulic master-cylinders used notably in braking systems or in clutch control systems of automotive vehicles.

From French Pat. specification No. 1,440,394 hydraulic mastercylinders are known which comprise a cylinder connected to an utilizing circuit and in which a piston generally operated by a pedal through a push rod slides in a sealing-tight manner. The piston carries at both ends two sealing-tight elastic packings, one directed towards the atmosphere and one disposed with axial and radial clearance to correspond to the piston head. This elastic packing, referred to as the valve ring, cooperates with a shoulder provided on the piston head to stop communication between the pressure chamber of the cylinder which is connected to the utilizing circuit and the hydraulic fluid supply reservoir during forward movement of the piston and to restore such communication during the rearward or return phase of the piston in the event of the pressure chamber should be replenished with fluid from the reservoir.

During the return stroke of the piston assuming there was a small fluid leakage from the utilizing circuit, a vacuum can occur in the pressure chamber. This vacuum causes the valve ring to disengage the shoulder so that additional fluid enters into the pressure chamber to reduce the vacuum level.

The same type of condition frequently happens during the bleeding operation of the master-cylinder. However, it may also happen that due to friction forces between the peripheral part of the valve ring and the wall of the cylinder receiving the piston. If the valve ring prematurely disengages the shoulder during the return stroke of the piston there is a sharp decrease of the pressure level prevailing in the pressure chamber. This last event reduces the reliability of the master-cylinder by dangerously increasing the lost motion of the piston in case of vehicle braking wherein the vehicle driver operates its brake pedal by successive and relatively short actuations. According to the invention described in the before referenced patent, a spring leaf is provided to avoid premature valve-ring unseating. However, this technical solution is not satisfactory due to the fact that the spring rate should respond to two antagonist requests, on one hand being high enough to overcome the friction forces thereby avoiding premature opening and on the other hand being low enough to permit fluid replenishing as soon as vacuum is created in the pressure chamber.

BRIEF SUMMARY OF THE INVENTION

The present invention proposes a hydraulic master-cylinder comprising in a housing having a bore for receiving a sliding piston. The piston and housing cooperate to define therein a pressure chamber which is adapted in use to be connected to an utilizing circuit. A seal packing referred to as a valve ring is disposed around the piston head adjacent to said pressure chamber. The valve ring has a peripheral edge sealingly sliding on said bore and an inner edge defining a radial clearance with said piston head. The valve ring is mounted with an axial clearance between a shoulder on said piston head and a stop. The valve ring is urged toward an abutment on said piston head by a resilient member. The said valve ring, by fluid-tight cooperation with said shoulder controls the fluid communication between said pressure chamber and a low pressure reservoir. A low preloaded one-way valve associated with the piston head and the valve ring controls the fluid communication in an in line relationship with said valve ring. The one-way valve permits fluid to flow from said low pressure reservoir into the pressure chamber whenever the piston is out of its rest position.

DETAILED DESCRIPTION OF THE INVENTION

Figure 1:
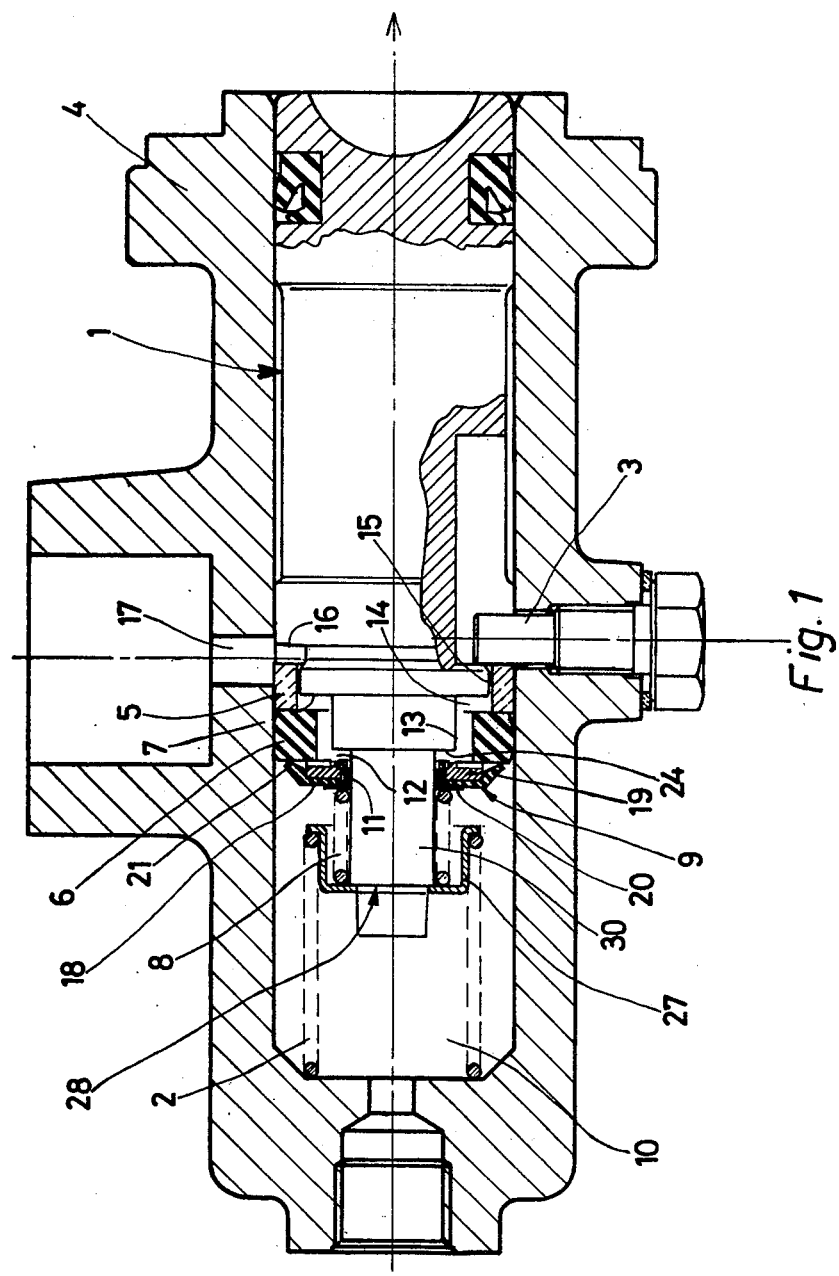
FIG. 1 is a longitudinal section through a master-cylinder made according to the principles of this invention in its rest position.

The master-cylinder shown in FIG. 1 is in the rest or released position. In this position, piston 1 is pushed by the spring 2, which is more highly loaded than the spring 8, against a stop pin 3 disposed in the body 4 of the master-cylinder. A spacer ring 5 separates the annular packing or valve-ring made of elastomeric material from the radial shoulder 7, overcoming the opposing action of the spring 8 which acts on the valve ring 6 through a one-way valve 9.

In the rest position shown on FIG. 1, the valve ring 6 and the central part of the valve 9 are disengaged from the shoulder 7 and an abutment 24 provided in the piston head 30. Therefore, the pressure chamber 10 communicates freely with the supply reservoir (not shown) through a fluid connection defined by the passages 11, 12, 13, 14, 15, 16 and 17. The one-way valve 9 is mounted in this fluid connection in line relationship with the valve ring 6. The valve 9 exercises normally, when the piston is moved out of its rest position, a double closing action by applying its outer edge 21 against the valve ring 6 and its central rigid part including the hub 22 against the abutment 24. However, as explained in details further in this description, the elastic outer-edge 21 performs the function of a movable member of a one-way valve in event of creation of negative pressure in the pressure chamber 10.

Figure 4:
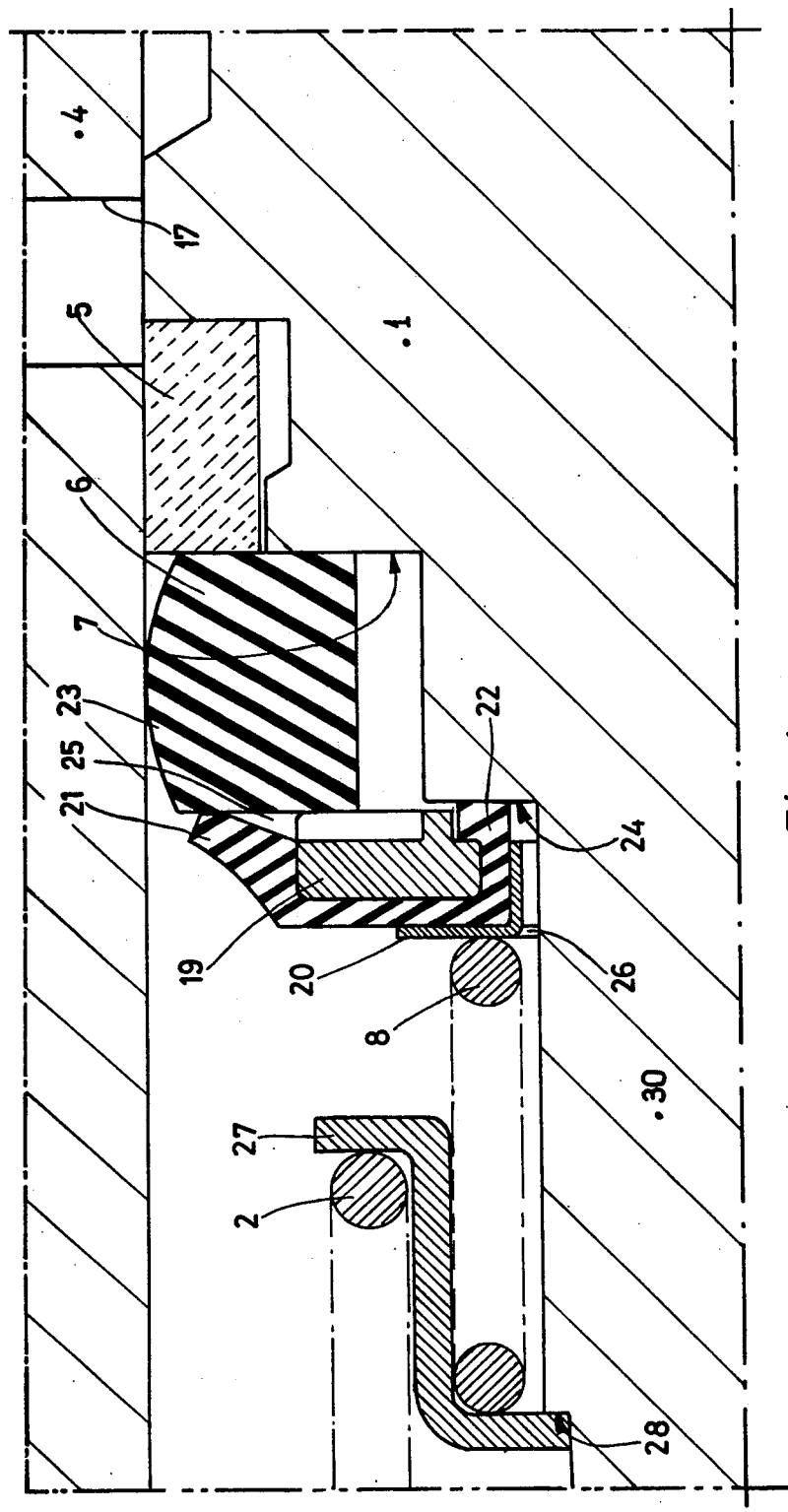
FIG. 4 is a fragmentary enlarged view of a detail of FIG. 2.

A centering and guide cup 20 of the one-way valve 9 faces the pressure chamber and carries, in positions corresponding to its inside diameter, tabs 26 as best shown in FIG. 4 and slots incorporated between the tabs. The function of the tabs is to guide the valve 9 on the cylindrical protuberance 30 projecting from the head of the piston, towards the pressure chamber 10. The function of the slots is to guarantee fluid communication between the pressure chamber 10 and the reservoir when the valve 9 is open in the rest position of the piston, i.e. separated from the shoulder 24.

The cylindrical portion of piston 1 on which the valve ring 6 is mounted with radial clearance, and at the end of which is disposed the shoulder 24 on which the central hub 22 of the valve 9 bears in fluid-tight fashion during the pressure phase, is of such a length as to guarantee that, in its rest position, the inner sealing-tight hub 22 of the valve 9 becomes separated from the shoulder 24 as is illustrated in FIG. 1.

The return spring 8 acting on the valve 9 bears the cup 20 and is held at the other end by another cup 27 which in turn is biased by the piston return spring 2 to permanently bear against a shoulder 28 provided on the extension of the protuberance 30. As already stated, the loading of the spring 2 is higher than that of the spring 8.

Figure 2:
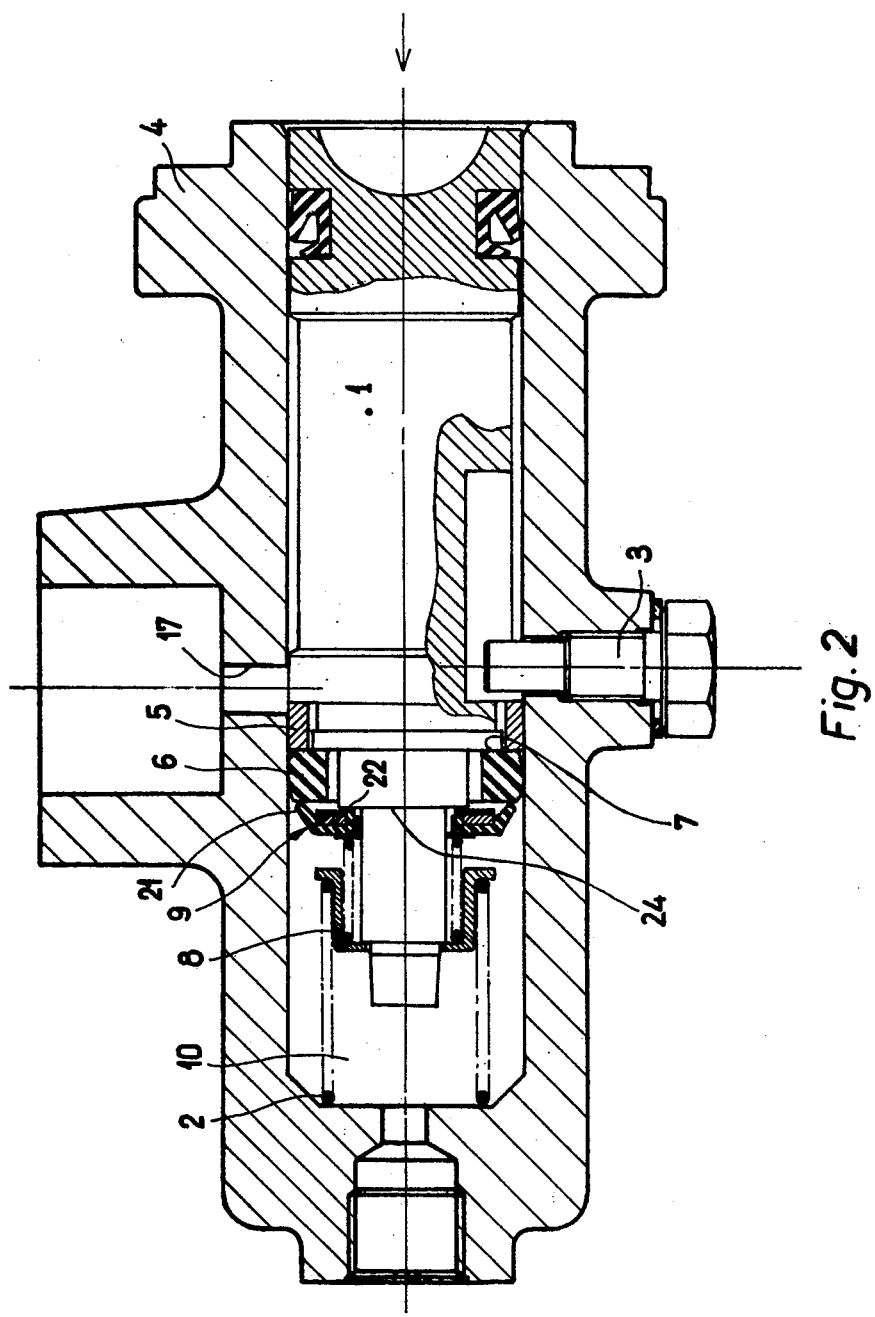
FIGS. 2 and 3 show the master-cylinder illustrated in FIG. 1 at two different moments of operation of the safety valve.

When the operational pushrod of the master-cylinder pedal is operated, the piston 1 moves away from the stop pin 3 and the valve ring 6 with the safety valve 9, biased by the spring 8, becomes so disposed that they tend to close all the communicating passages between the pressure chamber 10 and the reservoir, as illustrated in FIGS. 2 and 4.

If impurities are present in the cavities in the elements comprising the axial closure mechanism of the valve ring 6 to the extent of jeopardizing adequate bearing of the ring 6 against the closure surface of the shoulder 7, the one-way valve 9 nevertheless guarantees fluid-tightness between the pressure chamber and the reservoir, by means of the closure effected by its outer elastic edge 21 against the ring 6 and by the control hub 22 against the shoulder 24.

The shoulder 24 provided on the protuberance 30 of the piston is disposed in such a position that when the piston 1 abuts against the stop pin 3, there is axial and radial clearance between the central hub 22 of the one-way valve 9 and the shoulder 24.

The safety valve gas best illustrated in FIG. 4 is in the form of a cup and has in the centre an annular hub forming an inner elastic edge 22 and on the periphery a flared lip forming the outer edge 21. In the example illustrated, the valve 9 is made of rubber, but it could also be made of a different material, particularly from the metal plate.

Figure 3:
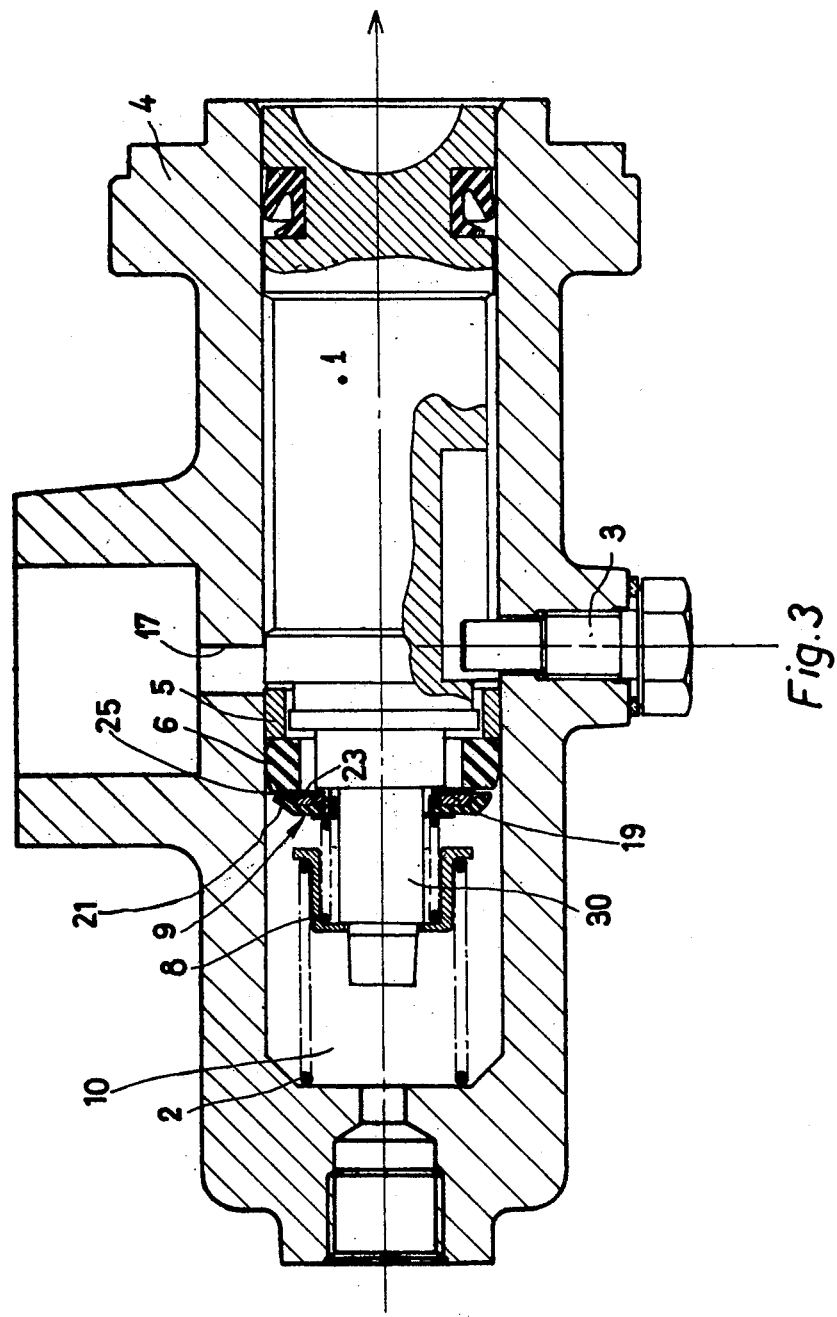

As illustrated in FIG. 3, the one-way or safety valve 9 operates in event a negative pressure is generated in the chamber 10 during the return stroke of the piston 1. Whenever such negative pressure occurs, by reason of leakage in the utilizing circuit or following a bleeding operation, the pressure in the circuit dropped to the level of atmospheric pressure. In such a case, the negative pressure created in the chamber 10 causes an elastic deformation of the outer lip 21. The structure of lip 21 is obviously sensitive also to very low levels of vacuum. Thus, the fluid can return from the reservoir through a flow path consisting of passage 25, passages 23 consisting of radial channels or splines in the rigid element 19, and passages 13, 14, 15, 16, and 17. To this end it is necessary that the axial length of the valve ring 6 is smaller than the distance between the shoulder 7 and the adjacent face of the rigid ring 19 which acts as stop means for the ring 6. Therefore, assuming there is a slight vacuum or negative pressure in the chamber 10, the valve ring 6 disengages the shoulder 7 until abutting the rigid ring 19 to permit additional fluid to flow from the reservoir into space 25 along the splines 23 and to lift the lip 21 of ring 6.

The one-way valve 9 is likewise adapted to guarantee fluidtightness between the pressure chamber 10 and the reservoir even in the presence of significant friction force between the outer periphery of the valve ring 6 and the cylindrical wall of the body 4, which tends to separate the valve ring 6 from the shoulder 7 before the end of the return stroke of the piston 1. The return spring 8 in fact discharges its own thrust, via the safety valve 9, onto the shoulder 24 and the rigid ring 19 stops the displacement of the valve ring 6 towards the left.

This return spring 8 is so dimensioned as to overcome the maximum friction force which may, by the effect of the various parameters of design, be created between the sealing ring 6 and the relative cylindrical wall on which it slides. Also in the case of premature disengagement of the valve ring 6 from its position of closure, fluid-tightness of the device between the pressure chamber 10 and the reservoir is therefore nevertheless ensured by the double closing action performed by the one-way valve 9.

The double closure system with the above-described valve is also applicable to a known type of dual circuit master cylinder, notably to a tandem master-cylinder.

I claim:

1. In a master cylinder comprising: a housing having a bore for receiving a sliding piston, said piston cooperating with said housing to define a pressure chamber in said bore, said bore being connected to a utilizing circuit, a packing seal being disposed around the head of said sliding piston adjacent to said pressure chamber, said packing seal having a peripheral edge sealingly sliding in said bore and an inner edge defining a radial clearance with the head of said piston, said packing seal being mounted between a shoulder on the head of said piston and a stop means resiliently urged toward an abutment on said piston head, said packing seal by fluid-tight cooperation with said shoulder controlling the fluid communication between said pressure chamber and a low pressure reservoir, and a low preloaded safety valve associated with the head of said piston and the packing seal to control said fluid communication as an in line relationship, said safety valve permitting fluid to flow from said low pressure reservoir into said pressure chamber when said piston returns to its rest position in the event of creation of a negative pressure in said pressure chamber, said packing seal cooperating with a sleeve which engages a stop pin secured to said housing when said piston is in its rest position so as to overcome an intermediate spring and seat off the packing seal and the central part of the safety valve from the shoulder and the abutment respectively, thus creating an axial clearance between said packing seal and said shoulder, said safety valve being a frontal sealing-tight valve axially movable along a protuberance of the piston head projecting towards the pressure chamber, said safety valve having a central substantially rigid part defining said stop means for the packing seal and being adapted to sealingly engage said abutment.

2. The servomotor according to claim 1, wherein the peripheral part of the safety valve resiliently and sealingly engages a frontal surface of the packing seal.

3. The servomotor according to claim 2, wherein the safety valve is cup-shaped and presents at its central part a hub and a flared-out resilient lip at its peripheral part.

4. The servomotor according to claim 3, wherein the hub is provided with splines so as to avoid undue fluid-tight cooperation between said hub and said frontal surface of the packing seal.

5. The servomotor according to claim 4, wherein said hub is received in a guide cup having radially extending projections sliding on said protuberance, a radial gap being provided between said hub and said protuberance to avoid fluid flow hindering.

6. The servomotor according to claim 1, wherein said safety valve is urged towards said abutment by an intermediate spring abutting a stopper biased by a piston return spring onto a stop provided on said protuberance, said piston return spring having a higher preload than that of said intermediate spring.

7. The servomotor according to claim 1, wherein the safety valve is made of elastomeric material.

8. The servomotor according to claim 7, wherein the central part of said safety valve is reinforced with a rigid metallic ring.

* * * * *